United States Patent [19]

Brenneman et al.

[11] Patent Number: 4,721,739
[45] Date of Patent: Jan. 26, 1988

[54] ERASABLE INK COMPOSITIONS

[75] Inventors: Richard S. Brenneman, Natick; Paul M. Drennan, W. Newton; Irving J. Arons, Peabody; Alice H. Pincus, Andover, all of Mass.; Chaudhary M. Ramzan, Milford, Conn.

[73] Assignee: BIC Corp., Milford, Conn.

[21] Appl. No.: 779,305

[22] Filed: Sep. 23, 1985

Related U.S. Application Data

[63] Continuation of Ser. No. 550,211, Nov. 9, 1983, abandoned, which is a continuation of Ser. No. 394,124, Jul. 1, 1982, abandoned.

[51] Int. Cl.$^4$ .................. C09D 11/18; C08L 53/00
[52] U.S. Cl. ........................................ 523/161; 524/505
[58] Field of Search ............... 524/505, 504, 315, 361, 524/365, 376, 379, 515, 517, 518, 523, 524, 525, 490, 491; 525/93, 95, 98, 271, 314; 523/160, 161

[56] References Cited

U.S. PATENT DOCUMENTS

| | | |
|---|---|---|
| Re. 27,145 | 6/1971 | Jones . |
| T959,010 | 6/1977 | Hansen .................................. 525/97 |
| 3,265,765 | 8/1966 | Holden et al. ...................... 260/876 |
| 3,595,942 | 7/1971 | Wald et al. . |
| 3,784,587 | 1/1974 | Chambers . |
| 3,875,105 | 4/1975 | Daugherty et al. . |
| 3,880,953 | 4/1975 | Downey . |
| 3,972,848 | 8/1976 | Lakshmanan . |
| 3,993,613 | 11/1976 | Doss . |
| 3,997,498 | 12/1976 | Reese .................................... 523/161 |
| 4,011,178 | 3/1977 | Muse . |
| 4,039,629 | 8/1977 | Himes . |
| 4,059,554 | 11/1977 | Pacansky . |
| 4,097,290 | 6/1978 | Muller et al. ........................ 106/30 |
| 4,101,482 | 7/1978 | Doss . |
| 4,101,484 | 7/1978 | Doss .................................... 525/99 |
| 4,104,326 | 8/1978 | Fodor . |
| 4,138,378 | 2/1979 | Doss .................................... 525/95 |
| 4,193,676 | 3/1980 | Hatanaka . |
| 4,207,359 | 6/1980 | Hannon ................................ 525/98 |
| 4,212,676 | 7/1980 | Ueda .................................... 106/19 |
| 4,216,131 | 8/1980 | Himes . |
| 4,216,132 | 8/1980 | Zweig . |
| 4,221,490 | 9/1980 | Malm .................................... 401/29 |
| 4,229,338 | 10/1980 | Hansen . |
| 4,243,500 | 1/1981 | Glennon .............................. 525/98 |
| 4,244,862 | 1/1981 | Handa . |
| 4,256,494 | 3/1981 | Yamamoto ........................... 106/22 |
| 4,286,077 | 8/1981 | St. Clair .............................. 525/98 |
| 4,288,399 | 9/1981 | Siedenstrang ....................... 525/98 |
| 4,288,567 | 9/1981 | Feeney ................................ 525/98 |
| 4,297,260 | 10/1981 | Feree . |
| 4,329,262 | 5/1982 | Mueller ................................ 523/161 |
| 4,329,264 | 3/1982 | Muller .................................. 523/162 |
| 4,349,639 | 9/1982 | Muller .................................. 523/161 |
| 4,357,431 | 11/1982 | Murakami ............................ 523/161 |
| 4,367,966 | 1/1983 | Williams .............................. 401/190 |
| 4,368,076 | 1/1983 | Iijima .................................... 106/22 |
| 4,379,867 | 4/1983 | Noriaki ................................ 523/161 |
| 4,389,499 | 6/1983 | Riesgraf .............................. 523/161 |
| 4,390,646 | 6/1983 | Ferguson ............................. 523/161 |
| 4,391,927 | 7/1983 | Farmer, III ......................... 523/161 |
| 4,407,985 | 10/1983 | Muller ................................. 523/161 |
| 4,410,643 | 10/1983 | Muller ................................. 523/161 |
| 4,419,464 | 12/1983 | Williams ............................. 523/161 |
| 4,441,928 | 4/1984 | Iijima .................................... 106/21 |
| 4,471,079 | 9/1984 | Enami .................................. 523/161 |
| 4,509,982 | 4/1985 | Iijima .................................... 106/23 |
| 4,525,216 | 6/1985 | Nakanishi ............................ 106/30 |
| 4,606,769 | 8/1986 | Tanaka ................................. 106/30 |

FOREIGN PATENT DOCUMENTS

| | | |
|---|---|---|
| 55-137166 | 10/1980 | Japan . |
| WO83/1625 | 5/1983 | PCT Int'l Appl. . |
| 1092563 | 11/1967 | United Kingdom . |
| 1429934 | 3/1976 | United Kingdom . |

OTHER PUBLICATIONS

KRATON Thermoplastic Rubber Crumb, Shell Oil Company (1980).

*Primary Examiner*—Christopher Henderson
*Attorney, Agent, or Firm*—Pennie & Edmonds

[57] ABSTRACT

This discovery relates to an erasable ink composition that can be erased using an ordinary pencil eraser. It can be used in ball point pens. Other applicators can be used.

Of course, the composition includes colorant and solvent. The combination of a thermoplastic elastomer and plasticizer components are important to the composition. The elastomer is a block copolymer, and the plasticizer is advantageously an ester. Other components include lubricant, resin and dispersant. Concentration ranges for the colorant is from 0.1% to 60%, for the thermoplastic elastomer is from 8% to 30%; for the plasticizer is from 10% to 35%; for the solvent is from 10% to 40%; for the resin is up to about 12%; for the lubricant is up to about 8% and for the dispersant is up to about 2%, all percent by weight of the composition. The colorant is conventional; the thermoplastic elastomer and plasticizer are not conventional. The thermoplastic elastomer is styrene-butadiene-styrene; styrene-isoprene-styrene or styrene-polyolefin-styrene. The latter thermoplastic elastomer is advantageous. The advantageous plasticizer is dioctyl adipate. The weight ratio of thermoplastic elastomer to plasticizer is 0.1 to 3.0. Other advantageous components are a polyterpene resin, lauric acid and methyl cyclohexane solvent. The latter component has a Hildebrand solubility range from 6.9 to 7.8 (cal./cm$^3$)$^{\frac{1}{2}}$.

This discovery also relates to a process of forming erasable script.

35 Claims, No Drawings

ERASABLE INK COMPOSITIONS

CROSS REFERENCE TO RELATED APPLICATIONS

This is a continuation of application Ser. No. 550,211, filed Nov. 1, 1983, abandoned, which application is a continuation of application Ser. No. 394,124, filed July 1, 1982, abandoned.

TECHNICAL FIELD

This invention relates to an ink composition that is erasable. The composition can include colorant, thermoplastic elastomer, plasticizer, solvent, lubricant, resin as well as other conventional ingredients known to those skilled in the art. Script formed with this ink can be erased using a conventional pencil eraser. The invention also relates to a process of forming erasable script.

BACKGROUND ART

Erasable writing compositions are well known in the art. They can be dispensed through ball point writing instruments as well as other writing devices. The compositions are designed to facilitate removal of script before affixed to a substrate, like paper. For a writing medium to be erasable, the writing composition must temporarily prevent penetration of the substrate by colorant. If penetration is not inhibited, the substrate can be damaged before the writing composition is erased. This erasable feature has necessitated undesirable rheological properties for prior art compositions.

Rheological properties of commercial erasable ink compositions inhibit delivery of a uniform layer of ink to substrates. Simply, commercially available erasable ink compositions used in ball point pens have the disadvantage of not producing a uniform script. Those compositions are hard to start. Ink intensity varies with writing speed; script is not sharp. Typically, this script is characterized by filaments of ink which detract from line sharpness. Such defects apparently result from undesirable rheological properties of the commercially available ink compositions. The rheology widely deviates from Newtonian behavior.

Known commercial erasable ink compositions have undesirable rheological properties. U.S. Pat. No. 4,097,290 to Muller et al. relates to an erasable ink composition which contains natural rubber or rubber which essentially duplicates the chemical structure of natural rubber. It also contains a volatile low-boiling point organic solvent as well as a high-boiling point organic solvent. The composition operates by rapid evaporation of the low-boiling solvent when the composition is applied to substrates. The viscosity of the mixture increases and penetration of the remaining natural rubber and colorant is minimized because the remaining residue thickens. Then, the high-boiling solvent evaporates and the pigmented rubber adheres to and penetrates into the substrate. Then, the ink is no longer erasable.

Another known commercialized erasable ink composition also possesses the aforementioned disadvantages. U.S. Pat. No. 3,875,105 to Daugherty et al. teaches an erasable ink composition containing a low-boiling solvent, a polyvinyl methyl ether and a colorant. Specific concentrations are taught for these components. When the composition is applied to a substrate, such as paper, the solvent quickly evaporates to effect an increase in viscosity. The polyvinyl methyl ether is only soluble in the solvent. When the solvent evaporates, the ether precipitates to capture colorant. Consequently, the colorant remains on the paper and does not penetrate it.

Both of these commercial compositions effect radical changes in rheological properties with respect to conventional inks. These commercial compositions rely upon this effect to acheive temporary erasability of the ink composition.

The present invention seeks to overcome the disadvantages of such compositions. Prior art compositions rely on radical changes in the rheological properties of the compositions which necessitate wide deviation from Newtonian behavior. Rather, the present invention is directed to an erasable ink composition which can approach Newtonian behavior, that is, water-like behavior. Simply, the composition of the present invention can flow on application of a small force and for which its rate of flow is approximately directly proportional to the applied force.

SUMMARY OF THE INVENTION

This discovery relates to an erasable ink composition that can be erased using a pencil eraser. The erasable ink can be used in conventional ball point pens.

The composition contains colorant, a novel combination of a thermoplastic elastomer and plasticizer components and solvent. The combination of the thermoplastic elastomer and plasticizer is important to the composition. Other ingredients can include resins, lubricants and dispersants. The colorant and solvent are conventional; the interaction of all the components is not conventional. The invention also relates to a process for forming erasable script.

Nomenclature

A lexicon has been used herein to identify and refer to the various types of components used in the erasable ink composition of the present invention. These components are colorant, thermoplastic elastomer, plasticizer, solvent, resin and lubricant, which are defined as follows:

Colorant means a solid insoluble coloring material such as a pigment, dispersions thereof or means a dyestuff. If possible, these materials are identified by a color index number.

Thermoplastic elastomer means those materials which have rubber-like characteristics at ambient temperature (e.g., −10° F. to 120° F.) but can be melted and processed at elevated temperatures (e.g., 250° F. to 500° F.). The elastomers are soluble in innocuous solvents and bond colorant. The elastomers include block copolymers as well as thermoplastic elastomers having like properties but not homopolymers or random copolymers.

Plasticizer means a high-boiling point solvent or softening agent, usually liquid, added to the elastomer to facilitate processing or to increase flexibility or toughness. The plasticizer is incompatible with the elastomer.

Solvent means a substance capable of dissolving the thermoplastic elastomer.

Resin means a solid to liquid low molecular weight modifier for the elastomer.

Lubricant means an ink additive that increases slip or decreases friction during use of the erasable ink composition.

Other terms are conventional.

DISCLOSURE OF THE INVENTION

The present invention relates to an erasable ink composition comprising a thermoplastic-elastomer block copolymer in which the end groups are composed of non-elastomeric blocks which act as physical cross links in the absence of specific solvents and when the material is below the $T_g$, glass transition temperature, of the non-elastomer block, a plasticizer which is incompatible or of limited compatibility with the thermoplastic-elastomer copolymer in the absence of a solvent, a solvent which acts as a solvent for the copolymer and is at least compatible with the plasticizer to produce an uniformly dispersed composition that flows on application of a small force, and a colorant, said composition when applied to a porous substrate as an ink causes evaporation of said solvent without significant penetration of the composition into the porous substrate to produce a colored script comprising the copolymer and the incompatible plasticizer which is erasable without smearing and in which the plasticizer gradually bleeds out of the copolymer due to its incompatibility and the copolymer physically cross links in time to form a non-erasable permanent colored script.

The invention also relates to a process of forming an erasable ink script which, within time, becomes permanent and non-erasable which comprises applying to a porous substrate by suitable means a composition comprising a thermoplastic-elastomer block copolymer in which the end groups comprise non-elastomeric thermoplastic blocks containing physically cross-linkable groups, a plasticizer which is incompatible with or of limited compatibility with the thermoplastic-elastomer copolymer in the absence of a solvent, a colorant, a solvent which acts as a solvent for the thermoplastic-elastomer copolymer and is at least compatible with the plasticizer to produce a uniformly disbursed composition that flows on application of a small force, evaporating the solvent from the composition after it has been applied to the porous substrate without significant penetration of the composition into the porous substrate to produce a colored script comprising the copolymer and the incompatible plasticizer which is erasable without smearing, permitting the incompatible plasticizer to gradually bleed out of the copolymer into the porous substrate and permitting the copolymer to gradually physically cross link to form a non-erasable colored script.

Concentration ranges for the colorant is from about 0.1% to about 60%, for the thermoplastic elastomer is from about 8% to about 30%; for the plasticizer is from about 10% to about 35% and for the solvent is from about 10% to about 40%, all percent by weight of the composition. Henceforth, concentrations are percent or parts by weight of the composition.

The combination can further comprise resin in an amount up to about 12%, lubricant in an amount up to about 8% and dispersant in an amount up to about 2%. Concentrations for other components are well known to those skilled in the art.

It has not been possible to discern the causes or physical changes that occur when the ink is written on paper that effect erasability. The mechanism by which the erasable ink composition of this invention effects temporary erasability is just not known. This mechanism is not crucial to the advantageous practice of this invention. The following discussion merely postulates what is believed to be a mechanism that could describe the interaction of components to effect temporary erasability.

For ink to be erased from a substrate, the ink must not wet or penetrate it. Paper, a common substrate, is a pervious mat of fibers. The surface of the paper has pores or capillary intertices of randomly oriented paper fibers. As long as the colorant in the ink does not enter the pores, the ink can be erased. Once colorant penetrates the pores of the paper, the colorant anchors within the paper; and it can only be removed by abrasion of that porous surface. Even after damaging the paper in this manner, a residual stain from the anchored colorant can remain.

To avoid damaging the substrate when removing ink and to prevent residual stain, penetration of colorant into paper pores is controlled. Control is believed to be affected by regulating the solubility parameter for the plasticizer in the initially homogeneous composition of thermoplastic elastomer, plasticizer and solvent. The elastomer and plasticizer are of limited compatibility. Solubility of the elastomer is affected by the type of plasticizer, weight ratio of plasticizer to elastomer and, most particularly, by the selection of a solvent having an appropriate solubility parameter.

Before evaporation of solvent, it functions to make the mixture homogeneous and to prevent elastomer from crosslinking. When the composition is placed on the substrate, the solvent evaporates. Rate of evaporation determines the period during which the ink composition is erasable. Once the solvent has evaporated, the remainder of the composition becomes incompatible. Then, the plasticizer is squeezed out of the incompatible mixture. The plasticizer, which is incompatible with the elastomer, begins to bleed into the pores of the paper. Although colorant is bonded to the elastomer, some bleeds or secretes with the plasticizer. This impregnation stains the paper. Bleeding is complete after from about 24 to 72 hours and the ink is no longer erasable without damaging the paper. This period varies with the choice of plasticizer and its concentration relative to the elastomer. While the bleeding is occurring, a certain amount of cold flow is believed to take place and the bulk ink film creeps or sags into the paper crevices where it is inaccessible to erasure. Thereafter, the ink is anchored to the paper and is permanent script.

The colorant is a conventional component of the composition that functions to provide color to the ink. Typically the colorant is pigment, which contains insoluble particles. An advantageous concentration range is between about 20% to about 30% for pigments. Particle size for the pigment should be less than 5 microns. Pigment dispersions can also be used in a concentration range between about 1% and about 50%. Pigment can be dispersed in the thermoplastic elastomer or in any of the necessary plasticizers or resins. Dyestuffs can be used in a concentration range between about 0.1% and about 6%. Typical colorants that can be used in this novel composition include: Phthalocyanine Blue (PB 15), 50% Pigment Blue 15 in Rosin, Pure Blue Oleate (Solvent Blue 5), 70% Victoria Blue (Pigment Blue 1) in Styrene-Ethylene/Butylene-Styrene, 60% Victoria Blue in Styrene-Ethylene/Butylene-Styrene, 40% Victoria Blue in Dioctyl Adipate, 50% Permanent Red 2B (Pigment Red 48) in Styrene-Ethylene/Butylene-Styrene, 40% Carbon Black (Pigment Black 6) in Dioctyl Adipate, Quinacridone Red (PR 122), Watchung Red B (PB 48-1), Watchung Red Y (PB 48-2), Radiant Red/Orange, Perylene Red (PR 177), Carbon Blacks, Permanent Yellow (PY 14, 15 or 16), Carbazole Violet (PV 23), Victoria Blue (PV 1), Rhodamine PMA (PV 1), Violet 36, Oleate of Solvent Blue 4, Victoria Pure Blue BO Oleate of Methyl Violet Oleate. Other conventional colorants known to those skilled in this art can also be used in formulating the erasable ink.

The combination of two other components is critical and important. Their use produces an unexpected result. These components are the thermoplastic elastomer and the plasticizer. The thermoplastic elastomer is a block copolymer and differs fundamentally in molecular structure from the typical plastic or commercial rubber (homopolymers or random copolymers). The block copolymer has chains of at least three blocks, an elastomeric block in the center and a thermoplastic block on each end. The homopolymers or copolymers do not have such a molecular structure. These synthetic ink components determine characteristics of flow, stability and erasability, which relate to performance of the erasable ink composition.

Writing performance of a ball point pen is dependent on a consistent delivery of a uniform layer of ink to the ball surface of all writing speeds. In the simplest case:

$$Q \text{ (ink film thickness)} = \frac{F \text{ (ink drive force)}}{K \text{ (geometry of point)} \eta \text{ (viscosity)}}$$

For a non-pressurized, non-erasable ball point pen, F is equal to the force of gravity. Viscosity is a measure of resistance to flow and is about 50–150 poise for non-erasable ink. It is constant at all normal writing speeds. For the normal, non-erasable ball point pen ink, such a viscosity range closely resembles behavior of Newtonian fluids. As a result, such pens deliver a uniform layer of ink at usual writing speeds and produce a uniform script.

Defects of the commercially available erasable inks are believed to be due to the necessarily undesirable rheology of commercial erasable inks. They have much higher viscosity than non-erasable inks and show wide deviations from Newtonian behavior, and, furthermore, viscosity is not a constant factor throughout the normal range of writing speeds.

As a consequence of this difficult behavior, commercial erasable ball point pens are pressurized. This facilitates delivery of the composition to the tip of the pen. Pressure is required because the force of gravity is inadequate to overcome the ink's resistance to flow. Inks having viscosity in the range of 540 to 4000 poises require pressure up to 200 psig. Under these conditions, the commericial inks filament and splatter to produce non-sharp script at normal writing speeds.

However, the present invention results in an erasable ink composition that unexpectedly:
 (a) does not have the rheological deficiencies noted for commercial erasable ball point pen ink, and
 (b) the composition can function in pens with or without pressurization.

When pressure is applied to the composition, the greatest pressure required is 100 psig. This novel composition can function at lower viscosities and without thixotropy—decreasing viscosity with increasing writing speed—compared to commercial erasable inks. Thermoplastic elastomers have been found to uniquely and advantageously adapt to conflicting demands of erasable inks.

The erasable ink of the present invention can more nearly approximate Newtonian flow characteristics of normal, non-erasable ball point pen ink. This is achieved by judicious selection of thermoplastic elastomer solvents and plasticizer. The function of the elastomer is to bind colorant when the ink dries. The plasticizer functions in conjunction with the solvent to control rheology thereby facilitating delivery of erasable ink from a pen. When wet with solvent, the plasticizer may also function as a co-solvent for the elastomer. When dry or in the absence of solvent, the plasticizer functions to carry enough colorant to the substrate to make permanent script.

According to the present invention, the thermoplastic elastomer is a block copolymer of styrene-butadiene-styrene, styrene-isoprene-styrene or styrene-ethylene/butylene-styrene block copolymers. Other thermoplastic elastomers of like properties are known to those skilled in the art and can also be used.

The latter block copolymer has an ethylene-butylene midblock, that is, a polyolefin midblock. It is a styrene-diene-styrene copolymer in which the chemical structure of the diene component has been modified by partial hydrogenation. It is obtained by selectively hydrogenating polystyrene/polybutadiene/polystyrene where the polybutadiene has a relatively high 1,2 cis configuration. The polyolefin midblock copolymer is more important than other block copolymers. It has surprisingly excellent resistance to degradation by oxygen, ozone, ultraviolet light, temperature and moisture.

These block copolymers, having selectively hydrogenated conjugated diene blocks, are described in U.S. Pat. No. 3,595,942 and in reissue U.S. Pat. No. 27,145. Those patent disclosures are hereby incorporated by reference. The advantageous concentration range for these block copolymers is from about 10% to about 20%.

The effect of plasticizers on rheology and properties of the thermoplastic elastomer-based erasable ball point pen ink was unexpected. The plasticizers of the present invention were neither known to be plasticizers for the thermo-plastic rubber nor known to be solvents for it. It has also been discovered that plasticizers are important and inhibit gelation of high solids content thermoplastic elastomer solutions, which are suitable for erasable ink formulations. For example, known plasticizers for thermoplastic elastomers (aliphatic or aromatic hydrocarbon oils) will cause such solutions to gel to a solid; while equivalent or lesser amounts of plasticizers of this invention will allow indefinite liquidity of such solutions with essentially no change in viscosity during storage. Aliphatic esters are advantageous for this purpose, such as butyl stearate or dioctyl adipate, although aromatic esters, such as dioctyl phthalate are useful. Viscosity varies with admixture of aliphatic and aromatic hydrocarbon solvents.

The effect of a mixture of aliphatic and aromatic hydrocarbon solvents and plasticizers that are esters is an erasable synthetic ball point pen ink that has a stable viscosity ranging from less than about 48 poise to about 500 poise. Any of the inks in this viscosity range can be dispensed from a pressurized or non-pressurized ball point pen. Suitable pressure should be employed, that is, lower pressure for lower viscosity inks and higher pressures for higher viscosity inks. The greatest pressure required is about 100 psig. The lower viscosity inks of the present invention can be dispensed from a non-pressurized ball point pen cartridge in a manner similar to normal ball point ink.

Best initial erasure can be obtained by maintaining the thermoplastic elastomer to plasticizer weight ratio between about 0.1 and about 1.5. Good delayed erasure resistance, however, is obtained above the thermoplastic elastomer to plasticizer weight ratio of about 1.5. The script becomes non-erasable to smear prone above a weight ratio of about 3. Thus, a variety of erasure properties can be obtained on a single type of paper by varying the ratio of thermoplastic elastomer to plasticizer or the ink can be tailored for acceptable erasure properties on a wide variety of papers by the same mechanism. Different plasticizers, or mixtures of plasticizers, also affect erasure properties. Dioctyl adipate or a mixture of it with a polyterpene resin is advantageous. It has the widest range of erasure properties on commercially available writing papers.

The plasticizer is advantageously an ester which can be aliphatic or aromatic, for example, dioctyl phthalate, dioctyl adipate, decylbutyl phthalate, dibutyl phthalate, octyldecyl phthalate, butylbenzyl phthalate, dioctyl azaleate, dioctyl sebacate, butyl stearate, tricresyl phosphate, straight chain phthalate esters or polymeric ester plasticizer. The plasticizer improves erasability and improves lubricity for a ball point pen. The advantageous concentration range is from about 15% to about 26%. Some hydrocarbon plasticizers are also useful: paraffinic oil, aromatic or naphthenic oil.

Through the unexpected results of plasticizers and solvents on the properties of thermoplastic elastomers, various useful erasable ball point ink formulations can be easily made with selected colorants to provide a variety of appealing, erasable colored script in accordance with the teachings of this application by those skilled in the art.

Solvent is included in the composition. It functions to dissolve the elastomer along with the plasticizer. The solvent can be aromatic or aliphatic or mixtures thereof. The erasable formulations are such that the thermoplastic elastomer is dissolved in solvents whose Hildebrand solubility ranges from about 6.9 to about 7.8 $(cal./cm^3)^{\frac{1}{2}}$. Some of these solvents or mixtures, thereof, preferentially dissolve the olefin phase of the block copolymer, others favor the styrene blocks. The nature of the solution helps to retard the penetration of ink into paper fibers, permitting erasure. Exemplary solvents are alcohols, ethers, esters, hydrocarbons, chlorinated hydrocarbons, lactol spirits, heptane, methyl cyclohexane, isoparathenic solvents, toluene, high-boiling aromatic solvents, xylene, ethyl benzene, ketones, butyl acetate or methyl cellosolve. The advantageous concentration range is between about 10% and about 30%.

Other components are useful but optional in the composition of the present invention. They include resins, lubricants and dispersants. The resin is preferably a solid plasticizer for the elastomer. It functions to delay erasability and control change in the physical characteristics of wet ink. Other conventional additives including driers, waxes, antioxidants, surface energy reducing agents, thickeners, gellants, defoamers, wetting agents, inhibitors, stabilizing agents, and shorteners known to persons of ordinary skill in the art can also be included. Those other ingredients should not affect the novel rheological properties of this inventive erasable ink composition.

According to the invention, suitable resins are cyclized rubber, glycerol esters of abietic acid, polyterpene resins, methyl styrene vinyl toluene copolymers, aromatic hydrocarbon resins, polystyrene resins, coumarone indene resins or polyterpene oligimers. The thermoplastic polyterpene resin is advantageous. The resin tends to alter both the gel-like system of the present invention and its adhesion, thereby promoting greater penetration into the substrate. This penetration effects increasing erasure resistance as the time for paper contact progresses. The advantageous concentration range is up to about 10%.

The inventive composition can also include a dispersant such as alkylated polyvinyl pyrolidone. The concentration is up to about 2%.

The following tabulation summarizes the components and their concentration ranges for the novel erasable ink composition for ball point pens that is erasable using an ordinary pencil eraser:

| Component | | Concentration | |
|---|---|---|---|
| Generic | Advantageous | Broad | Advantageous |
| (a) colorant | — | 0.1–60% | 20–30% |
| (b) block co-polymer | styrene-ethylene/butylene-styrene | 8–30% | 10–20% |
| (c) plasticizer | dioctyl adipate | 10–35% | 15–26% |
| (d) solvent | methyl cyclohexane | 10–40% | 20–30% |
| (e) resin | polyterpene resin | 0–12% | 0–10% |
| (f) lubricant | lauric acid | 0–8% | 2–4% |
| (g) dispersant | — | 0–2% | — |

Manufacture of the erasable ink composition of the present invention is conventional. It can consist of two operations: vehicle preparation and color dispersion. Vehicle preparation is conventional and can comprise merely desolving the vehicle in a solvent. Color dispersion is usually done in conventional ball mills. Other operations known to those of ordinary skill in the art can be included in this manufacture.

The erasable ink of the present invention is most suitable for ball-point pens. The ink can flow under gravitational forces or under pressure. Means can be provided for applying to the ink a pressure exceeding atmospheric pressure. This can include confining compressed or liquified gas, such as air, nitrogen, carbon dioxide and freon above the erasable ink in an ink cartridge. This can also include enclosing a substance which makes a gas when warmed. Mechanical means can also generate the pressure. Pressure can be atmospheric, mechanical, chemical or from a gas.

EXAMPLES

The following examples illustrate the novel erasable ink formulation. As pointed out above, it has not been possible to discern what causes erasability nor the mechanism of the components that effects it. However, the effect of different blends of colorant, elastomer, plasticizer and solvent on erasability can be demonstrated. These examples are merely illustrative of the formulations and are not considered to limit the present invention.

Example I

An erasable ink composition is formulated using the following components in the specified concentrations:

| Component | Concentration |
|---|---|
| 70% Victoria Blue Pigment Dispersion In Styrene-Ethylene/ | 30.50% |

| Component | Concentration |
|---|---|
| Butylene-Styrene Thermoplastic Elastomer (TPE) | |
| 50% Pigment Blue 15 In Rosin Dyestuff | 10.00% |
| Styrene-Ethylene/Butylene-Styrene TPE | 6.00% |
| Dioctyl Adipate Plasticizer | 16.30% |
| Toluene | 10.00% |
| Lactol Spirits | 18.00% |
| Cyclized Rubber Resin | 4.00% |
| Lauric Acid Lubricant | 5.00% |
| 2,'2-methylene bis (4-ethyl-6-tert-butylphenol) Antioxidant | 0.20% |
| | 100.00% |

The composition is made by adding solvent, plasticizer, lubricant and antioxidant to a closed mixing vessel. Other optional components can be added. These components are mixed slowly while heating to 110° to 120° F. Mixing is continued for 30 minutes. The thermoplastic elastomer is added to the components being mixed. Mixing continues for one hour. The pigment dispersion and the dyestuff are added. Mixing continues for an additional three hours. When mixing is completed, any solvent lost during mixing is augmented.

Example II

Example I is repeated except using the following formulation:

| Component | Concentration |
|---|---|
| 40% Victoria Blue Pigment Dispersion In Dioctyl Adipate | 40.00 parts |
| Styrene-Ethylene/Butylene-Styrene TPE | 22.00 parts |
| Polyterpene Resin | 1.50 parts |
| Lactol Spirits | 30.00 parts |
| Cyclized Rubber | 1.00 parts |
| Lauric Acid | 5.00 parts |
| 2,'2-methylene bis (4-ethyl-6-tert-butylphenol) | 0.20 parts |
| | 99.70 parts |

Example III

Example I is repeated except using the following formulation:

| Component | Concentration |
|---|---|
| 60% Victoria Blue Pigment In Styrene-Ethylene/Butylene-Styrene TPE | 9.80% |
| 40% Victoria Blue Pigment Dispersion In Dioctyl Adipate | 42.00% |
| Styrene-Ethylene/Butylene-Styrene TPE | 10.00% |
| Lactol Spirits | 28.10% |
| Polyterpene Resin | 2.50% |
| Cyclized Rubber | 4.00% |
| Lauric Acid | 3.40% |
| 2,'2-methylene bis (4-ethyl-6-tert-butylphenol) | 0.20% |
| | 100.00% |

Example IV

Example I is repeated except using the following formulation:

| Component | Concentration |
|---|---|
| 60% Victoria Blue Pigment In Styrene-Ethylene/Butylene-Styrene TPE | 10.00 parts |
| 40% Victoria Blue Pigment Dispersion In Dioctyl Adipate | 40.00 parts |
| Styrene-Ethylene/Butylene-Styrene TPE | 11.00 parts |
| Chloroparaffin | 2.50 parts |
| Lactol Spirits | 28.30 parts |
| Polyterpene Resin | 4.00 parts |
| Cyclized Rubber Resin | 4.00 parts |
| Lauric Acid | 3.50 parts |
| 2,'2-methylene bis (4-ethyl-6-tert-butylphenol) | 0.25 parts |
| Non-Ionic Surfactant | 0.50 parts |
| | 104.05 parts |

Example V

Example I is repeated expect using the following formulation:

| Component | Concentration |
|---|---|
| 60% Victoria Blue Pigment Dispersion In Styrene-Ethylene/Butylene-Styrene TPE | 8.00% |
| 40% Victoria Blue Pigment Dispersion In Dioctyl Adipate | 40.00% |
| Styrene-Ethylene/Butylene-Styrene TPE | 9.80% |
| Lactol Spirits | 28.00% |
| Polyterpene Resin | 3.00% |
| Cyclized Rubber | 4.00% |
| Lauric Acid | 5.00% |
| Lubricant | 2.00% |
| 2,'2-methylene bis (4-ethyl-6-tert-butylphenol) | 0.20% |
| | 100.00% |

Example VI

Example I is repeated except using the following formulation:

| Component | Concentration |
|---|---|
| 60% Victoria Blue Pigment Dispersion In Styrene-Ethylene/Butylene-Styrene TPE | 20.00 parts |
| 40% Victoria Blue Pigment In Dioctyl Adipate | 40.00 parts |
| Styrene-Ethylene/Butylene-Styrene TPE | 10.80 parts |
| Lactol Spirits | 26.00 parts |
| Polyterpene Resin | 2.00 parts |
| Cyclized Rubber | 3.00 parts |
| 2,'2-methylene bis (4-ethyl-6-tert-butylphenol | 0.20 parts |
| Alkylated Polyvinylpyrolidone | 1.00 parts |
| | 103.00 parts |

Example VII

Example I is repeated except using the following formulation:

| Component | Concentration |
|---|---|
| 50% Permanent Red 2B Pigment Dispersion In Styrene-Ethylene/Butylene-Styrene TPE | 50.00% |
| Styrene-Ethylene/Butylene-Styrene TPE | 19.00% |
| Dioctyl Adipate | 1.00% |

-continued

| Component | Concentration |
|---|---|
| Lactol Spirits | 24.00% |
| Polyterpene Resin | 3.00% |
| Lauric Acid | 2.00% |
| Alkylated Polyvinylpyrolidone | 1.00% |
| | 100.00% |

Example VIII

Example I is repeated except using the following formulation:

| Component | Concentration |
|---|---|
| 40% Victoria Blue Pigment In Dioctyl Adipate | 20.00% |
| 40% Carbon Black Pigment Dispersion In Dioctyl Adipate | 30.00% |
| Styrene-Ethylene/Butylene-Styrene TPE | 20.00% |
| Lactol Spirits | 24.00% |
| Polyterpene Resin | 3.00% |
| Lauric Acid | 2.00% |
| Alkylated Polyvinylpyrolidone | 1.00% |
| | 100.00% |

Example IX

Example I is repeated except using the following formulation:

| Component | Concentration |
|---|---|
| 70% Victoria Blue Pigment Dispersion In Styrene-Ethylene/Butylene-Styrene TPE | 34.00% |
| Styrene-Ethylene/Butylene-Styrene TPE | 8.00% |
| Dioctyl Phthalate | 17.00% |
| Petroleum Solvent | 19.00% |
| Petroleum Solvent | 17.00% |
| Lauric Acid | 3.00% |
| Alkylated Polyvinylpyrolidone | 1.00% |
| Corrosion Inhibitor | .50% |
| Tris (Mixed Mono Dinonyl Phenyl) Phosphite | .50% |
| | 100.00% |

Example X

Example I is repeated except using the following formulation:

| Component | Concentration |
|---|---|
| 70% Victoria Blue Pigment Dispersion In Styrene-Ethylene/Butylene-Styrene TPE | 34.00% |
| Styrene-Ethylene/Butylene-Styrene TPE | 5.00% |
| Dioctyl Phthalate | 17.00% |
| Toluene | 7.00% |
| Petroleum Solvent | 19.00% |
| Petroleum Solvent | 10.00% |
| Polybutylene Resin | 3.00% |
| Lauric Acid | 3.00% |
| Alkylated Polyvinylpyrolidone | 1.00% |
| Corrosion Inhibitor | .50% |
| Tris (Mixed Mono Dinonyl Phenyl) Phosphite | .50% |
| | 100.00% |

Example XI

Example I is repeated except using the following formulation:

| Component | Concentration |
|---|---|
| 40% Victoria Blue Pigment Dispersion In Dioctyl Adipate | 50.00% |
| Macrolin Blue RR (Solvent Blue 97) | 1.00% |
| Styrene-Ethylene/Butylene-Styrene TPE | 20.00% |
| Lactol Spirits | 24.00% |
| Polyterpene Resin | 2.00% |
| Lauric Acid | 2.00% |
| Alkylated Polyvinylpyrolidone | 1.00% |
| | 100.00% |

Example XII

Example I is repeated except using the following formulation:

| Component | Concentration |
|---|---|
| 40% Victoria Blue Pigment Dispersion In Dioctyl Adipate | 50.00% |
| Styrene-Ethylene/Butylene-Styrene TPE | 20.00% |
| Lactol Spirits | 24.00% |
| Polyterpene Resin | 3.00% |
| Oleic Acid | 0.50% |
| Lauric Acid | 1.50% |
| Alkylated Polyvinylpyrolidone | 1.00% |
| | 100.00% |

Example XIII

Example I is repeated except using the following formulation:

| Component | Concentration |
|---|---|
| 40% Victoria Blue Pigment Dispersion In Dioctyl Adipate | 50.00% |
| Styrene-Ethylene/Butylene-Styrene TPE | 20.00% |
| Lactol Spirits | 24.00% |
| Polyterpene Resin | 3.00% |
| Oleic Acid | 2.00% |
| Alkylated Polyvinylpyrolidone | 1.00% |
| | 100.00% |

Example XIV

Example I is repeated except using the following formulation:

| Component | Concentration |
|---|---|
| 70% Victoria Blue Pigment Dispersion In Styrene-Ethylene/Butylene-Styrene TPE | 33.00% |
| Styrene-Butadiene-Styrene TPE | 10.00% |
| Dioctyl Phthalate | 25.00% |
| Methyl Cyclohexane | 28.00% |
| Lauric Acid | 3.00% |
| Corrosion Inhibitor | 0.50% |
| Tris (Mixed Mono Dinonyl Phenyl) Phosphite | 0.50% |
| | 100.00% |

Example XV

Example I is repeated except using the following formulation:

| Component | Concentration |
|---|---|
| 40% Victoria Blue Pigment Dispersion In Dioctyl Adipate | 50.00 parts |
| Styrene-Butadiene-Styrene TPE | 20.00 parts |
| Dioctyl Phthalate Methyl Cyclohexane | 24.00 parts |
| Lauric Acid | 3.00 parts |
| Corrosion Inhibitor | 0.50 parts |
| Tris (Mixed Mono Dinonyl Phenyl) Phosphite | 0.50 parts |
| Alkylated Polyvinylpyrolidone | 1.00 parts |
| | 99.00 parts |

It is not intended to limit the present invention to the specific embodiments described above. It is recognized that other changes may be made in the formulations specifically described herein without deviating from the scope and teaching of the present invention. It is intended to encompass all other embodiments, alternatives and modifications consistent with the present invention.

We claim:

1. An erasable ink composition comprising:
   (a) a thermoplastic-elastomer block copolymer selected from the group consisting of styrene-butadiene-styrene, styrene-isoprene-styrene, styrene-polyolefin-styrene, and styrene-ethylene/butylene-styrene, said copolymer present in an amount from about 8% to about 30% by weight of the composition;
   (b) a plasticizer which is incompatible or of limited compatibility with the thermoplastic-elastomer copolymer in the absence of a solvent, said plasticizer being present in an amount from about 10% to about 35% by weight of the composition;
   (c) a solvent which acts as a solvent for the copolymer and is at least compatible with the plasticizer to produce a uniformly dispersed composition that flows on application of a small amount of force, said solvent having a Hildebrand solubility range from about 6.9 to 7.8 $(cal./cm^3)^{\frac{1}{2}}$ and being present in an amount from about 10% to about 40% by weight of the composition;
   (d) a colorant comprising a pigment or pigment dispersion in an amount from about 10% to about 60% by weight of the composition;
   (e) a resin in an amount of less than about 12% by weight of the composition;
   (f) a lubricant in an amount of less than about 8% by weight of the composition; and
   (g) an alkylated polyvinyl pyrrolidone or non-ionic surfactant-dispersant in an amount of less than about 2% by weight of the composition;
   said composition having a weight ratio of thermoplastic elastomer to plasticizer of about 0.1 to about 3 and a viscosity between about 48 and about 500 poise, and, when applied to a porous substrate as an ink, causing evaporation of said solvent without significant penetration of the composition into the porous substrate to produce a colored script comprising the copolymer and the incompatible plasticizer which script is erasable without smearing and in which the plasticizer gradually bleeds out of the copolymer due to their incompatibility with the copolymer physically crosslinking in time to form a non-erasable permanent colored script.

2. The composition according to claim 1 wherein the colorant is a dyestuff having a concentration from about 0.1% to about 6%.

3. The composition according to claim 1 wherein the colorant is Phthalocyanine Blue, 50% Pigment Blue 15 in Rosin, Pure Blue Oleate (Solvent Blue 5), 70% Victoria Blue (Pigment Blue 1) in Styrene-Ethylene/Butylene-Styrene, 60% Victoria Blue in Styrene-Ethylene/Butylene-Styrene, 40% Victoria Blue in Dioctyl Adipate, 50% Permanent Red 2B (Pigment Red 48) in Styrene-Ethylene/Butylene-Styrene, 40% Carbon Black (Pigment Black 6) in Dioctyl Adipate, Quinacridone Red, Watchung Red B, Watchung Red Y, Radiant Red/Orange, Perylene Red, Carbon Blacks, Permanent Yellow, Carbazole Violet, Victoria Blue, Rhodamine PMA, Violet 36, Oleate of Solvent Blue 4, Victoria Pure Blue BO Oleate or Methyl Violet Oleate.

4. The composition according to claim 1 wherein the plasticizer is an ester.

5. The composition according to claim 1 wherein the plasticizer is a hydrocarbon.

6. The composition according to claim 1 wherein the plasticizer is dioctyl phthalate, dioctyl adipate, decylbutyl phthalate, dibutyl phthalate, octyldecyl phthalate, butylbenzyl phthalate, dioctyl azaleate, dioctyl sebacate, butyl stearate, tricresyl phosphate, diiso octyl adipate, straight chain phthalate esters or polymeric ester plasticizers.

7. The composition according to claim 1 wherein the resin is cyclized rubber, glycerol esters of abietic acid, polyterpene resins, methyl styrene vinyl toluene copolymers, aromatic hydrocarbon resins, polystyrene resins, coumarone indene resins or polyterpene oligomers.

8. The composition according to claim 1 wherein the lubricant is lauric acid, stearic acid, polydimethylcyclosiloxane or chloroparaffin.

9. The composition according to claim 1 wherein the solvent is lactol spirits, heptane, methyl cyclohexane, isoparaffinic solvents, toluene, high-boiling aromatic solvents, xylene, ethyl benzene, ketones, butyl acetate, petroleum solvent or methyl cellosolve.

10. The composition according to claim 1 wherein the plasticizer is a hydrocarbon plasticizer and is paraffinic oil, aromatic or naphthenic oil.

11. The composition according to claim 1 suitable for use in ball point pens.

12. The composition according to claim 1 wherein the composition is under pressure.

13. The composition according to claim 12 wherein the pressure is exerted by mechanical means or by a gas.

14. The composition according to claim 1 wherein the weight ratio of thermoplastic elastomer to plasticizer is about 0.1 to about 1.5.

15. The composition according to claim 1 wherein the plasticizer is aliphatic, aromatic or a mixture thereof.

16. The composition according to claim 1 wherein the solvent is aliphatic, aromatic or a mixture thereof.

17. The composition according to claim 1 wherein said composition flows by gravity or when pressurized.

18. The composition according to claim 17 wherein the pressure is above atmospheric but below about 100 psig.

19. An initially substantially uniformly dispersed ink composition that flows on application of a small force, that becomes incompatible after temporarily retarding significant penetration of the composition into pores of a substrate so that the ink is erasable for a time using an ordinary pencil eraser consisting essentially of:

| Component | Concentration (percent by weight of the composition) |
|---|---|
| (a) victoria blue pigment dispersion in styrene-ethylene/butylene-styrene or in dioctyl adipate | 20–30% |
| (b) styrene-ethylene/butylene-styrene | 10–20% |
| (c) dioctyl phthalate or dioctyl adipate | 15–26% |
| (d) polyterpene resin | less than about 10% |
| (e) lauric acid | 2–4% |
| (f) methyl cyclohexane | 20–30% |

20. The composition according to claim 19 wherein the thermoplastic elastomer is styrene-isoprene-styrene rather than styrene-ethylene/butylene-styrene.

21. The composition according to claim 19 wherein the thermoplastic elastomer is styrene-butadiene-styrene rather than styrene-ethylene/butylene-styrene.

22. The composition according to claim 19 wherein the thermoplastic elastomer is styrene-polyolefin-styrene rather than styrene-ethylene/butylene-styrene.

23. An erasable ink composition consisting essentially of:
(a) a thermoplastic-elastomeric block copolymer selected from the group consisting of styrene-butadiene-styrene, styrene-isoprene-styrene, styrene-polyolefin-styrene, and styrene-ethylene/butylene-styrene, said copolymer present in an amount from about 8% to about 30% by weight of the composition;
(b) a plasticizer which is incompatible or of limited compatibility with the thermoplastic-elastomer copolymer in the absence of a solvent, said plasticizer being present in an amount from about 10% to about 35% by weight of the composition;
(c) a solvent which acts as a solvent for the copolymer and is at least compatible with the plasticizer to produce a uniformly dispersed composition that flows on application of a small amount of force, said solvent present in an amount from about 10% to about 40% by weight of the composition;
(d) a colorant comprising a pigment or pigment dispersion in an amount of from about 10% to about 60% by weight of the composition;
(e) a resin in an amount of less than about 12% by weight of the composition;
(f) a lubricant in an amount of less than about 8% by weight of the composition; and
(g) an alkylated polyvinyl pyrrolidone or non-ionic surfactant-dispersant in an amount of less than about 2% by weight of the composition;
said composition having a viscosity between about 48 and about 500 poise and, when applied to a porous substrate as an ink causing evaporation of said solvent without significant penetration of the composition into the porous substrate to produce a colored script comprising the copolymer and the incompatible plasticizer which script is erasable without smearing and in which the plasticizer gradually bleeds out of the copolymer due to their incompatibility, with the copolymer physically cross-linking in time to form a non-erasable permanent colored script.

24. The composition according to claim 23 wherein the colorant is Phthalocyanine Blue, 50% Pigment Blue 15 in Rosin, Pure Blue Oleate (Solvent Blue 5), 70% Victoria Blue (Pigment Blue 1) in Styrene-Ethylene/-Butylene-Styrene, 60% Victoria Blue in Styrene-Ethylene/Butylene-Styrene, 40% Victoria Blue in Dioctyle Adipate, 50% Permanent Red 2B (Pigment Red 48) in Styrene-Ethylene/Butylene-Styrene, 40% Carbon Black (Pigment Black 6) in Dioctyl Adipate, Quinacridone Red, Watchung Red B, Watchung Red Y, Radiant Red/Orange, Perylene Red, Carbon Blacks, Permanent Yellow, Carbazole Violet, Victoria Blue, Rhodamine PMA, Violet 36, Oleate of Solvent Blue 4, Victoria Pure Blue BO Oleate or Methyl Violet Oleate.

25. The composition according to claim 23 wherein the plasticizer is a hydrocarbon, a paraffinic, aromatic or napthenic oil, or an ester.

26. The composition according to claim 25 wherein the plasticizer is dioctyl phthalate, dioctyl adipate, decylbutyl phthalate, dibutyl phthalate, octyldecyl phthalate, butylbenzyl phthalate, dioctyl azaleate, dioctyl sebacate, butyl stearate, tricresyl phosphate, diiso octyl adipate, straight chain phthalate esters or polymeric ester plasticizers.

27. The composition according to claim 23 wherein the resin is cyclized rubber, glycerol esters of abietic acid, polyterpene resins, methyl styrene vinyl toluene copolymers, aromatic hydrocarbon resins, polystyrene resins, coumarone indene resins or polyterpene oligomers.

28. The composition according to claim 23 wherein the lubricant is lauric acid, stearic acid, polydimethylcyclosiloxane or chloroparaffin.

29. The composition according to claim 23 wherein the solvent is aliphatic, aromatic or a mixture thereof.

30. The composition according to claim 29 wherein the solvent is lactol spirits, heptane, methyl cyclohexane, isoparaffinic solvents, toluene, high-boiling aromatic solvents, xylene, ethyl benzene, ketones, butyl acetate, petroleum solvent or methyl cellosolve.

31. The composition according to claim 23 wherein the composition is under pressure.

32. The composition according to claim 24 wherein the pressure is exerted by mechanical means or by a gas.

33. The composition according to claim 23 wherein said composition flows by gravity or when pressurized.

34. The composition according to claim 33 wherein the pressure is above atmospheric but below about 100 psig.

35. The composition according to claim 23 suitable for use in ball point pens.

* * * * *